Patented Apr. 8, 1952

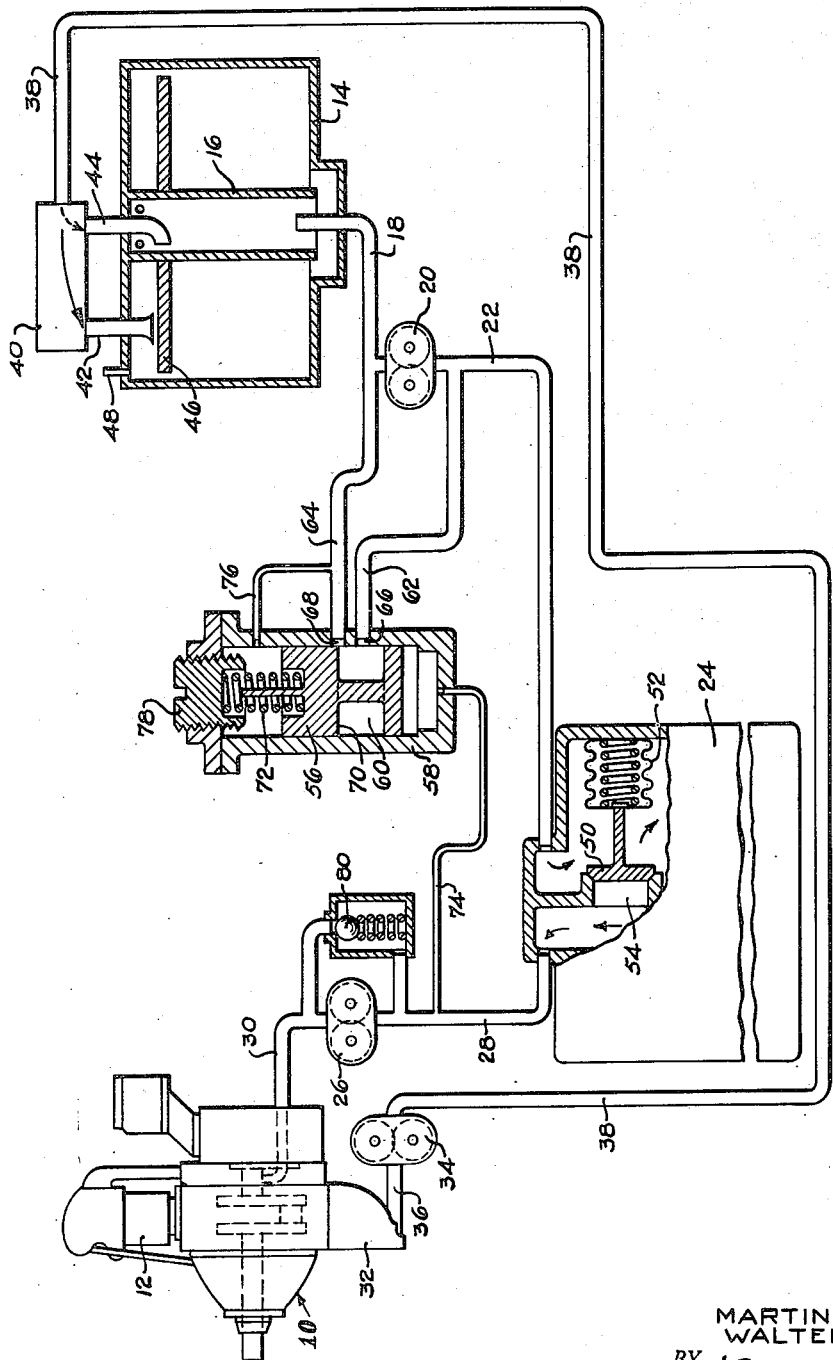

2,592,140

UNITED STATES PATENT OFFICE 2,592,140

LUBRICATION SYSTEM

Martin M. Holben, Ridgewood, and Walter L. Weeks, Wyckoff, N. J., assignors to Curtiss-Wright Corporation, a corporation of Delaware Application January 9, 1946, Serial No. 640,017

10 Claims. (Cl. 184—6)

This invention relates to engine lubrication systems and is particularly directed to a so-called dry-sump lubrication system.

In the conventional dry-sump lubrication system, particularly as used on aircraft engines, the engine lubricating oil is stored in a supply reservoir from which it is pumped to the various bearing surfaces of the engine. In the engine, the oil drains into a sump from which a scavenge pump returns the oil to the supply reservoir. In addition, an oil cooler is disposed between the scavenge pump and the supply reservoir. In order to insure removal of substantially all the oil draining into the engine sump, the scavenge pump is provided with a capacity in excess of that required for returning all the oil from the sump to the reservoir under the most adverse pump operating conditions. For example, the efficiency of conventional gear type scavenge pumps provided on aircraft engines decreases with decreasing pump inlet pressure and therefore the scavenge pump is provided with a capacity more than sufficient to handle the oil flow at high altitudes. As a result, at low altitudes the capacity of the scavenge pump is considerably in excess of the lubricating oil flow and therefore, the scavenge pump returns a large quantity of air and other gases as well as oil back into the reservoir through the oil cooler. It has been found that the oil-gas mixture leaving the oil cooler is very finely mixed; one of the reasons for this fine mixture probably is the resistance to oil flow offered by the cooler. This intimate mixture of oil and gases hinders its separation in the supply reservoir so that the oil handled by the engine oil pump contains a substantial percentage of gases. As a result of this entrainment of gases within the lubricating oil handled by the engine oil pressure pump, the altitude at which a given pump can still furnish the necessary engine oil pressure is considerably reduced. Also, the presence of gases within the oil passing through the oil cooler to the reservoir reduces the efficiency of the cooler.

Recently, the aforedescribed dry-sump lubrication system has been modified by placing the oil cooler between the supply reservoir and the engine oil pressure pump and by adding an additional pump for forcing the oil from the reservoir through the oil cooler to the oil pressure pump. With this modified system, the oil is returned directly from the scavenge pump to the oil supply reservoir and, therefore, the oil and gases returned to the supply reservoir are not so intimately mixed. In addition, with this modified system, the temperature of the oil in the supply reservoir is relatively high. Because of these two factors, a larger percentage of the gases separate out from the oil in the supply reservoir. This prior modified system also includes a connection from the supply reservoir directly to the inlet side of the oil pressure pump thereby by-passing the oil cooler pump and the oil cooler. With this latter arrangement, the inlet pressure at the oil pressure pump is limited to a small available static head of oil in the supply reservoir relative to said pump inlet.

It is an object of this invention to provide a lubrication system having an oil cooler and pump therefor disposed between the supply reservoir and the engine oil pressure pump and in which a substantial positive pressure is automatically maintained at the inlet of the oil pressure pump. In addition, it is an object of this invention to maintain substantially constant said positive pressure at the inlet of the oil pressure pump. This objective is obtained by controlling a relief valve for the oil cooler pump in response to changes in the inlet pressure at the oil pressure pump.

Other objects of this invention will become apparent upon reading the annexed detailed description in connection with the drawing which comprises a diagrammatic view of an engine lubrication system embodying the invention.

Referring to the drawing, a conventional internal combustion engine is schematically indicated at 10 and is provided with engine cylinders 12. An oil supply reservoir 14 for the engine is provided with a so-called warm-up hopper 16. A conduit 18 enters the reservoir at the bottom of the warm-up hopper and supplies oil therefrom to a pump 20 preferably driven by the engine 10. The pump 20 feeds the oil through a conduit 22 to an oil cooler 24 from which the oil is supplied to the inlet side of an engine oil pressure pump 26 through a conduit 28. The oil pressure pump 26, preferably driven by the engine, supplies oil under pressure through conduits such as 30 to the various bearing surfaces of the engine for lubrication of these surfaces.

The engine is provided with a sump 32 into which the engine lubricating oil drains. A scavenge pump 34, having a larger capacity than the oil pressure pump 26 and preferably driven by the engine, draws oil from the sump 32 through a conduit 36 and returns the oil through a conduit 38 to a conventional diverter valve 40. As schematically illustrated, the valve 40 is arranged to discharge the oil into either of two outlet conduits 42 and 44. The valve 40 may be manually operable or it may be a thermostatic valve automatically controlled by the temperature of the oil supplied to the engine. The conduit 42 discharges into the supply reservoir 14 over a baffle 46 disposed therein while the conduit 44 discharges into the aforementioned warm-up hopper 16. The oil discharging directly into the main portion of the reservoir 14 through the conduit 42 spreads out and flows slowly over the baffle 46 thereby facilitating the separation of gases from the oil. The reservoir 14 is also provided with a vent 48 which may be in communication with the engine crankcase as is conventional practice.

The diverter valve 40 normally returns the oil through conduit 42 to the main portion of the supply reservoir. However, in starting the engine when the engine is cold, the valve 40 is adjusted so that the returning oil is diverted into the warm-up hopper 16 so that only the small quantity of oil in the hopper is circulated through the engine whereby the engine oil quickly heats up.

As illustrated in the drawing, the oil cooler 24 is provided with a conventional combined thermostatic and pressure relief valve 50. The valve 50 is carried by a bellows 52 and, in the position illustrated, the valve closes a passage 54 by-passing at least a portion of the oil cooler. The bellows 52 contains a suitable gas and when the oil is cold, the bellows 52 contracts whereupon the valve 50 opens the by-pass passage 54. Similarly, when the pressure of the oil supply to the oil cooler becomes excessive, the oil pressure compresses the bellows to open the by-pass passage 54 thereby preventing excessive oil pressure within the oil cooler. When the valve 50 is closed, the oil flows through the cooler as indicated by the arrows on the drawing.

The oil pressure drop across the cooler 24 will vary not only with changes in the viscosity of the oil but also with changes in the position of the valve 50. Accordingly, if the output pressure of the pump 20 is constant, the inlet pressure of the pump 26 would vary with changes in the pressure drop across the oil cooler 24.

With the present invention, the inlet oil pressure at the pump 26 is maintained constant by automatically controlling a pressure relief valve at the pump 20. To this end, the pump 20 is provided with a valve 56 slidably mounted within a valve housing 58 and having an annular groove 60. The inlet and outlet sides of the pump 20 are in communication with the groove 60 via conduits 62 and 64 and valve housing openings 66 and 68 respectively. The upper edge 70 of the groove 60 controls the extent to which the opening 68 is uncovered. A spring 72 urges the valve 56 downwardly, as viewed in the drawing, for urging said valve in a direction for closing the valve opening 68 and the lower end of the structure connected to the valve 56 constitutes a piston which, via the passage 74, is subjected to the oil pressure at the inlet side of the pump 26 for urging the valve 56 in its opening direction. The upper side of the valve 56 is vented to the inlet side of the pump 20 via a conduit 76. The valve 56 is designed to maintain a substantial positive pressure at the inlet of the pump 26. At this point, it should be noted that considering the rate of oil supply to the engine, the capacity of the pump 20 should be sufficient to maintain a substantial positive pressure at the inlet of the pump 26.

With this arrangement, any increase in the inlet pressure of the pump 26 is transmitted to the valve 56, through the conduit 74, and results in an opening adjustment of the port 68 thereby decreasing the outlet pressure of the pump 26. Similarly, a decrease in the inlet pressure of the pump 26 results in a downward or closing adjustment of the valve 56 thereby increasing the outlet pressure of the pump 20 and the inlet pressure of the pump 26. In this way, the inlet pressure of the pump 26 is maintained substantially constant even though the pressure drop across the oil cooler 24 varies. The spring 72 bears against an adjustable nut 78 whereby adjustment of this nut determines the pressure maintained at the inlet of the pump 26.

A conventional spring-urged pressure relief valve 80 is placed around the pump 26 whereby, with a substantially constant inlet pressure to the pump 26, its outlet pressure, and therefore the pressure of the engine lubricating oil, is substantially constant.

With the aforedescribed system, the oil is returned to the supply reservoir substantially at the highest available oil temperature and with the least possible resistance thereby facilitating separation of the gases from the oil within the supply reservoir. Also, the pump 20 maintains a substantially positive pressure at the inlet of the pump 26 whereby the pump 26 is capable of maintaining the engine oil pressure at relatively high altitudes.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with a lubricating system for an engine comprising an oil supply reservoir, first and second pumps, an oil cooler, a first passageway connected between the outlet of said first pump and the inlet to said cooler, and a second passageway connected between the outlet of said cooler and the inlet of said second pump, the oil flow path from said reservoir to said engine being such that said first pump is arranged to draw oil from said reservoir and to pump said oil, sequentially, through said first passageway, through said cooler and thence through said second passageway to said second pump and said second pump is arranged to deliver said oil to various surfaces of the engine to be lubricated; first means providing a third passageway distinct from said flow path and having one end communicating with said second passageway; and second means operable to regulate the delivery pressure of said first pump, said second means including means subjected to the pressure at the other end of said third passageway for controlling the operation of said second means in response to oil pressure changes in said third passageway.

2. The combination recited in claim 1 in which said first and second means are arranged to maintain a substantially constant oil pressure at the inlet of said second pump.

3. The combination recited in claim 1 in which said second means includes a pressure relief valve for said first pump.

4. The combination recited in claim 3 in which, during operation of the system, said first and said second means maintain a substantially constant oil pressure at the inlet of said second pump;

said second means also including adjustable elastic means for determining the magnitude of the pressure maintained at the inlet of said second pump.

5. In combination with a lubricating system for an engine comprising an oil supply reservoir, first and second pumps, an oil cooler, a first passageway connected between the outlet of said first pump and the inlet to said cooler, and a second passageway connected between the outlet of said cooler and the inlet of said second pump, the oil flow path from and including said reservoir to said engine being such that said first pump is arranged to draw oil from said reservoir and to pump said oil, sequentially, through said first passageway, through said cooler and thence through said second passageway to said second pump and said second pump is arranged to deliver said oil to various surfaces of the engine to be lubricated: means providing a third passageway distinct from said flow path and having one end communicating with said second passageway; and a pressure relief valve for controlling the pressure in said second passageway, said pressure relief valve having means subjected to the pressure at the other end of said third passageway for urging said valve in an opening direction and having its outlet side communicating with said flow path upstream of said first pump.

6. In combination with a lubrication system for an engine comprising an oil supply reservoir, first and second pumps, an oil cooler, a first passageway connected between the outlet of said first pump and the inlet to said cooler, and a second passageway connected between the outlet of said cooler and the inlet of said second pump, the oil flow path from said reservoir to said engine being such that said first pump is arranged to draw oil from said reservoir and to pump said oil, sequentially, through said first passageway, through said cooler and thence through said second passageway to said second pump and said second pump is arranged to deliver said oil to various surfaces of the engine to be lubricated: first means providing a third passageway distinct from said flow path and having one end communicating with said second passageway; a pressure relief valve operable to regulate the delivery pressure of said first pump; and means operatively connected to said valve and subjected to the oil pressure at the other end of said third passageway for urging said valve in an opening direction.

7. The combination recited in claim 6 and including a spring for urging said valve in a closing direction.

8. The combination recited in claim 6 including a spring for urging said valve in a closing direction; and means for adjusting the force exerted by said spring on said valve.

9. The combination recited in claim 6 and including elastic means for urging said valve in a closing direction.

10. A lubrication system for an engine; said system comprising an oil supply reservoir; an oil cooler; a passageway communicating with the outlet of said cooler; an oil pump having its inlet side in communication with said reservoir and its outlet side in communication with said cooler for supplying oil from said reservoir to said cooler from which said oil is delivered through said passageway to bearing surfaces of said engine; a second passageway distinct from the flow path of the oil from said reservoir to said engine bearing surfaces and having one end communicating with said first passageway; a pressure relief valve communicating with the outlet side of said pump and movable in an opening direction for relieving the outlet pressure of said pump; yieldable means operatively connected to said valve for urging said relief valve in a closing direction; and means operatively connected to said valve and subjected to the oil pressure at the other end of said second passageway for urging said valve in an opening direction.

MARTIN M. HOLBEN.
WALTER L. WEEKS.

REFERENCES CITED

The following references are of record in the file of this patent:

FOREIGN PATENTS

| Number | Country | Date |
|--------|---------|------|
| 501,998 | Great Britain | Mar. 9, 1939 |